July 7, 1970   G. M. ZIEBER, JR., ETAL   3,518,896
REMOTE CONTROL ASSEMBLY HAVING AN ALL METAL CASING
Filed July 24, 1968
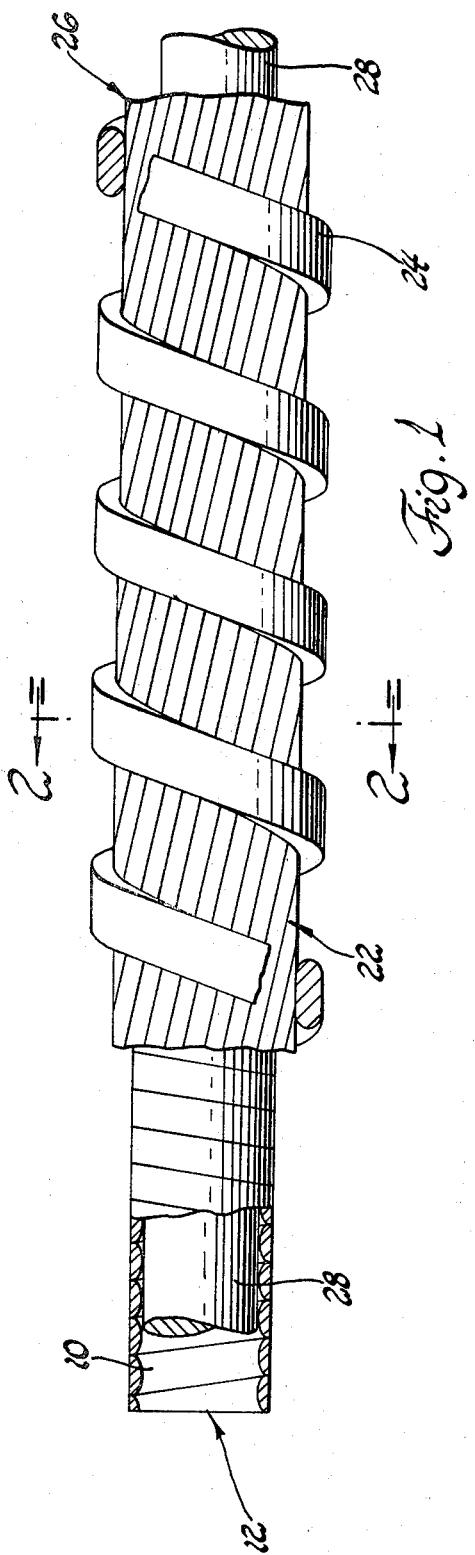
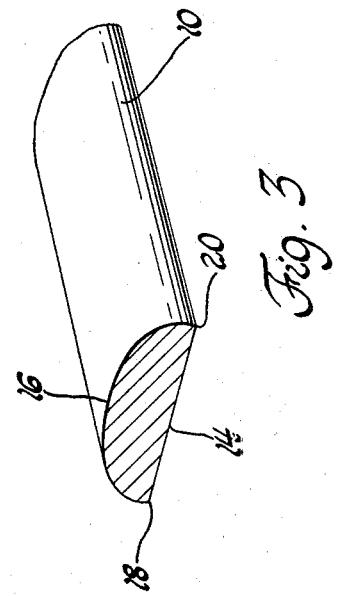
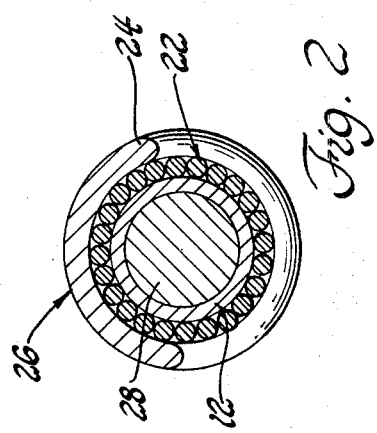
INVENTORS
George M. Zieber, Jr.
BY & Fred Machate
Barnard, McGlynn & Reising
ATTORNEYS

3,518,896
REMOTE CONTROL ASSEMBLY HAVING AN ALL METAL CASING
George M. Zieber, Jr., King of Prussia, and Fred Machate, Harleysville, Pa., assignors to Teleflex Incorporated, North Wales, Pa., a corporation of Delaware
Filed July 24, 1968, Ser. No. 747,176
Int. Cl. F16h 1/10
U.S. Cl. 74—501
12 Claims

ABSTRACT OF THE DISCLOSURE

In a preferred form, the present disclosure relates to an outer casing or conduit adapted for use with a motion transmitting remote control assembly wherein the outer casing is composed entirely of metal. This metal casing generally comprises a D-shaped wire wound in a short lead to form a monocoil, a plurality of lay wires wrapped onto the monocoil, and an outer metal strip wrapped on the lay wires on a long lead to form the composite structure. The innermost metal strip is preferably formed of phosphor bronze and presents the only surface contacted by a core element adapted to slide in the metal casing.

---

The present invention relates to motion transmitting remote control assemblies and, more particularly, to a construction of a casing for an outer conduit therefor.

A basic consideration in the construction of a motion transmitting remote control assembly is that the outer conduit or casing therefor be flexible but yet strong enough to withstand the rigors of the environment in which it is to operate. Further considerations include the provision of a casing for a motion transmitting remove control device wherein the core element or operating element is freely slidably contained with very little lateral movement allowed, and wherein the member on which it slides is composed of a material that will not damage or inhibit the movement of the core element during operation. To summarize then, a motion transmitting remote control assembly should be strong enough to be used in adverse environments, should be inexpensive to manufacture, and should have means provided therein for minimizing the friction that inevitably is generated as the core element slides back and forth.

The prior devices have attempted to solve the above-mentioned problems in various ways. For example, certain constructions of the prior art provide an all metal remote control assembly, but these assemblies are complex to construct and have very many dimensional tolerances to maintain. However, they are not so constructed that friction therein is minimized. For example, when a remote control assembly is bent to transmit motion at some angle relative to its own longitudinal axis as originally disposed, an adverse force is set up which, in a tubular element, causes a change in dimension at the turns which will inevitably incearse friction. Where a metal monocoil-type arrangement is used in a device of the prior art to negotiate a bend, square corners at the edges of the abutting surfaces in the convolutions are presented which generate friction. In addition, the elements themselves, or rather the portions thereof that contact the sliding core element, are flat friction surfaces causing a great deal of surface contact thereby increasing the friction of the assembly as the core element slides. Some devices of the prior art have attempted to solve the problem of friction between the convolutions of the monocoil by spacing the convolutions further apart so that they do not come into contact with one another. However, this has the disadvantage of forming a repository for lubricant and foreign material. Over a period of time, this foreign material will build up in these depositories causing a higher coefficient of friction thereby defeating their very purpose.

Certain devices have attempted to solve the problem of friction by providing rounded surfaces that are exposed to the sliding core element. Generally, these rounded surfaces comprise one portion of a wire that is wound helically to form a tubulous member. However, the helically wound wire that forms a monocoil generally requires some stabilizing material, such as rubber, to maintain its integrity of shape and, therefore, this type of assembly cannot be safely used in high temperature environment. Therefore, in the prior art, the types of constructions provided solve either the friction problem or the environmental problem but do not solve both in the same assembly.

The present invention contemplates the solution to all of the problems as previously set forth in the prior art by providing a motion transmitting remote control assembly comprising a first metal strip helically wrapped in abutting convolutions to form a monocoil, the strip having a flat first surface and a second surface that is continuously arcuate. A plurality of lay wires are wrapped on the monocoil and a second metal strip is wrapped on the lay wires to form a composite outer casing. The core element is then slidably disposed within the monocoil on the second surface thereby forming a composite motion transmitting remote control assembly. Within the present invention, therefore, a sub-assembly is formed wherein an outer conduit or casing is provided which includes a first elongated strip wrapped in a short lead in abutting convolutions to form a monocoil, the strip having a first surface that is flat and a second surface that is rounded and which merges into the first surface. Lay wires of elongated shape are wrapped on the monocoil on a long lead and therearound is wrapped a second elongated strip on a shorter lead and form spaced convolutions to hold the assembly together as a unit.

Accordingly, it is an object of the present invention to provide an improved motion transmitting remote control assembly comprising a first metal strip wrapped in abutting convolutions to form a monocoil, the strip having a first surface that is flat and a second surface that is continuously arcuate, a plurality of lay wires wrapped on the monocoil, and a second metal strip wrapped on the lay wires to form a composite structure with a core element being slidably disposed within the monocoil engaging the second surface.

It is another object of the present invention to provide an improved motion transmitting remote control assembly according to the previous object wherein the first metal strip is composed of a softer metal than the core element.

It is still another object of the present invention to provide an improved motion transmitting remote control assembly wherein a monocoil is formed of a metal strip that is D-shaped in cross section.

It is a further object of the present invention to provide an improved conduit for use in a motion transmitting remote control assembly comprising a first elongated strip wrapped on a short lead with abutting convolutions to form a monocoil, the strip having a first surface that is flat and a second surface that is continuously arcuate and merging into the first surface, lay wires wrapped onto the monocoil on a long lead, and a second elongated strip wrapped on the lay wires to collectively form a flexible conduit offering a low coefficient of friction to a core element and is thereby adapted for use in a high temperature environment.

It is still a further object of the present invention to provide an improved motion transmitting remote control assembly of all metal construction wherein an inner monocoil that is designed to come in contact with a core element is composed of a softer metal than the metal of other portions of the conduit.

Other objects and attendant advantages of the present invention will be readily appreciated as the same becomes better understood by reference to the following detailed description when considered in connection with the accompanying drawings wherein:

FIG. 1 is an elevational view of the subject invention with parts broken away;

FIG. 2 is a sectional view of the subject invention taken along line 2—2 of FIG. 1;

FIG. 3 is a perspective view showing a cross-sectional view of a portion of the monocoil construction of the subject invention.

Referring to FIG. 1, a first metal strip 10 is helically wrapped so that the convolutions thereof are abutting to collectively form a monocoil generally designated by numeral 12. The configuration of metal strip 10 is better seen in FIG. 3 and as illustrated therein has a first surface 14 that is flat and a second surface 16 that is continually arcuate and merges into the first surface at points 18 and 20.

Referring to FIG. 1, lay wires 22 are wound on monocoil 12 with a long lead, it being understood that the individual convolutions of monocoil 12 are wound on a short pitch or lead. Finally to complete the composite construction, a second metal strip 24 is helically wrapped on lay wires 22 with a longer lead than monocoil 12 but with a shorter lead than lay wires 22. Metal strip 24 and lay wires 22 are preferably of a harder metal than first metal strip 10 and serve to form a casing or conduit 26 in assembled disposition. It is obvious that lay wires 22 and metal strip 24 wrapped therearound allow a certain amount of flexibility to the composite structure so that the conduit generally designated by numeral 26 is adapted to negotiate bends in the environment in which it is used. The material of monocoil 12 can be such a material as phosphor bronze, but it is understood that the construction thereof is not so limited and other metals can be used with equal facility.

Referring to FIG. 2, core element 28, situated within monocoil 12, is adapted for sliding translational movement therein. Referring to FIG. 1, it is seen that the outer portions of core element 28 contact only second surface 16 of the first metal strip 10; and, therefore, there is essentially point contact and very little friction therebetween. In addition, the configuration of second surface 16 of metal strip 10 adapts the bending thereof without disturbing the single point of contact between convolutions and the point contact for core element 28 as it is operatively situated. It should be noted that because the abutting convolutions of the monocoil contact each other only at one point, friction is minimized therebetween. During the assembly operation of the subject conduit 26, the monocoil 12 acts as a mandrel for the winding of lay wires 22, and the lay direction determines the tightness of the wrap and affects the final ID. In addition, the monocoil lay direction should be opposite to the lay direction of lay wires 22 to minimize interaction between the faying surfaces. The purpose of the second metal strip 24 is to provide a hoop type holding means around the lay wires and monocoil preventing rupture to the lay wires and monocoil when under high stress. As previously stated, the monocoil can be of a material such as phosphor bronze while the lay wires and second metal strip can be the same material, for example, stainless steel.

Accordingly, the present invention provides a conduit for use in a motion transmitting remote control assembly that is of all metal construction, thereby adapting its use in the environment to high temperature. This assembly is so constructed, due to the D-shaped cross section of the first metal strip 10, so as to minimize friction between adjacent abutting convolutions. The finished conduit has no materials therein capable of breaking down under elevated temperatures because of the use of only metal, and further the conduit is so constructed as to be flexible thereby having the advantages of a conduit normally found in those that are not all metal. Additionally, the relatively simple construction of the conduit of the present invention lends itself to economical manufacture, thereby increasing its acceptance in the marketplace.

The invention has been described in an illustrative manner, and it is to be understood that the terminology which has been used is intended to be in the nature of words of description rather than of limitation.

Obviously, many modifications and variations of the present invention are possible in light of the above teachings.

The embodiments of the present invention in which an exclusive property or privilege is claimed are defined as follows:

1. A motion transmitting remote control assembly comprising: a first metal strip wrapped in abutting convolutions to form a monocoil, said strip having a first surface that is flat and a second surface that is continuously arcuate; a plurality of lay wires wrapped on said monocoil, a second metal strip wrapped on said lay wires to form a composite structure; and a core element slidably disposed within said monocoil engaging said second surface, said first metal strip being D shaped in cross-section and the arcuate portion of said D shape extends toward the longitudinal axis of said monocoil.

2. A motion transmitting remote control assembly according to claim 1 wherein said second surface merges with said first surface.

3. A motion transmitting remote control assembly according to claim 1 wherein said first metal strip is composed of a softer metal than said core element.

4. A motion transmitting remote control assembly according to claim 1 wherein said first metal strip is wrapped with a short lead relative to said lay wires and said second metal strip.

5. A motion transmitting remote control assembly according to claim 1 wherein said second metal strip is wrapped with a short lead relative to said lay wires.

6. A motion transmitting remote control assembly according to claim 1 wherein said first metal strip is made from phosphor bronze.

7. A motion transmitting remote control assembly according to claim 1 wherein said lay wires are wrapped in an opposite hand relative to said monocoil and said second metal strip is wrapped on said lay wires in an opposite hand relative to said lay wires.

8. A motion transmitting remote control assembly comprising; a metal monocoil wrapped in abutting convolutions on a short lead, said monocoil having a cross-section in each convolution which presents an arcuate radially inwardly exposed surface and a flat radially outwardly exposed surface, a plurality of long lay wires wrapped helicaly about said monocoil, a metal strip disposed helically about said long lay wires on a short lead and in spaced convolutions, and a core element movably disposed in said monocoil.

9. An assembly as set forth in claim 8 wherein core element is made of metal and one of said core element and said monocoil is of a softer metal than the other.

10. An assembly as set forth in claim 8 wherein said metal strip is a flat strip.

11. An assembly as set forth in claim 8 wherein said monocoil and said metal strip are wrapped in an opposite hand than said long lay wires.

12. An assembly as set forth in claim 11 wherein said metal strip is wrapped with a longer lead than said monocoil and a shorter lead than said long lay wires.

References Cited
UNITED STATES PATENTS

| | | | |
|---|---|---|---|
| 625,917 | 5/1899 | Arnold | 74—501 |
| 1,140,425 | 5/1915 | Wessoleck | 74—501 |
| 3,240,082 | 3/1966 | Bratz | 74—501 |

FRED C. MATTERN, JR., Primary Examiner

W. S. RATLIFF, JR., Assistant Examiner